Jan. 21, 1930.  C. A. COUPS  1,744,212
LOOM
Filed Dec. 21, 1927  3 Sheets-Sheet 1

Fig. 2ª

INVENTOR
Charles A. Coupe
BY
Kenyon & Kenyon
ATTORNEYS

Jan. 21, 1930.  C. A. COUPS  1,744,212
LOOM
Filed Dec. 21, 1927   3 Sheets-Sheet 2

Inventor
Charles A. Coups
By Attorneys
Kenyon & Kenyon

Jan. 21, 1930. C. A. COUPS 1,744,212
LOOM
Filed Dec. 21, 1927   3 Sheets-Sheet 3
Fig. 8
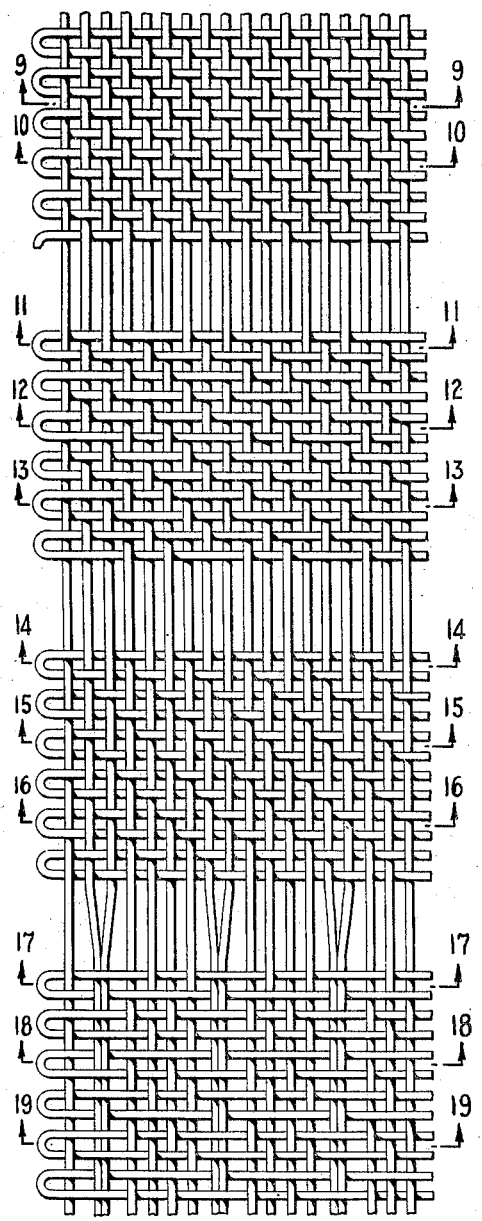
Fig. 9
Fig. 10
Fig. 11
Fig. 12
Fig. 13
Fig. 14
Fig. 15
Fig. 16
Fig. 17
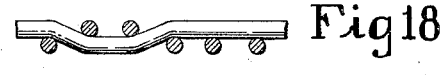
Fig 18
Fig. 19
INVENTOR
Charles A. Coups
BY
Kenyon & Kenyon
ATTORNEYS.

Patented Jan. 21, 1930

1,744,212

UNITED STATES PATENT OFFICE

CHARLES A. COUPS, OF BELLEVILLE, NEW JERSEY, ASSIGNOR TO EASTWOOD WIRE MANUFACTURING COMPANY, OF BELLEVILLE, NEW JERSEY, A CORPORATION OF NEW JERSEY

LOOM

Application filed December 21, 1927. Serial No. 241,480.

This invention relates to looms and particularly to looms for weaving wire cloth for use in paper making machinery.

An object of this invention is a loom by means of which wire cloth of different weaves may be produced without rethreading the loom.

According to this invention, the loom is equipped with a plurality of heddles preferably six or more. The harnesses for the heddles are connected to actuating levers each of which is operated through the medium of a cam. At least two and in some instances three harnesses are connected to each actuating member. Thus where the loom is equipped with six heddles there are provided either two or three actuating levers. Each harness is connected to the end of a supporting band passed over a pulley or the like so that the harnesses are caused to move in unison. When the loom is used to produce wire cloth of standard weave, each harness is supported by a single band. However, when the loom is used to produce wire cloth having twilled weave or modifications thereof, each harness is supported by at least two bands, the number of bands being preferably equal to the number of heddles. By changing the connections between the harnesses and the operating members and between the harnesses and the supporting bands and the connections between the operating and the actuating members, the loom may be used to produce, without rethreading wire cloth having different weaves.

Figure 1:
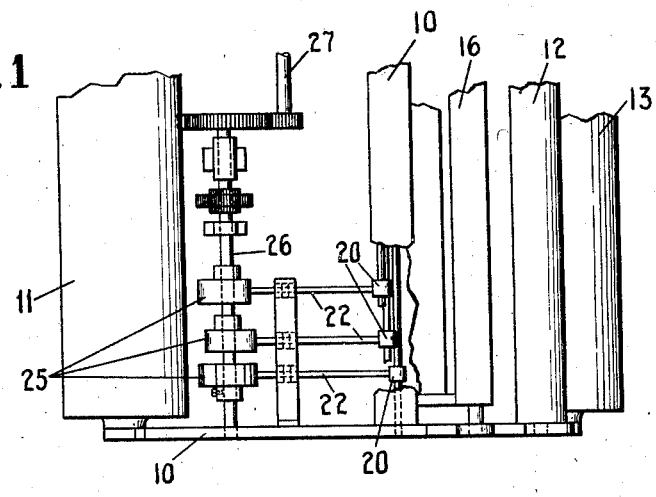

Other objects, novel features and advantages of this invention will be apparent from the following specification and accompanying drawings, wherein Figure 1 is a fragmentary plan view of a loom embodying the invention.

Figure 2:
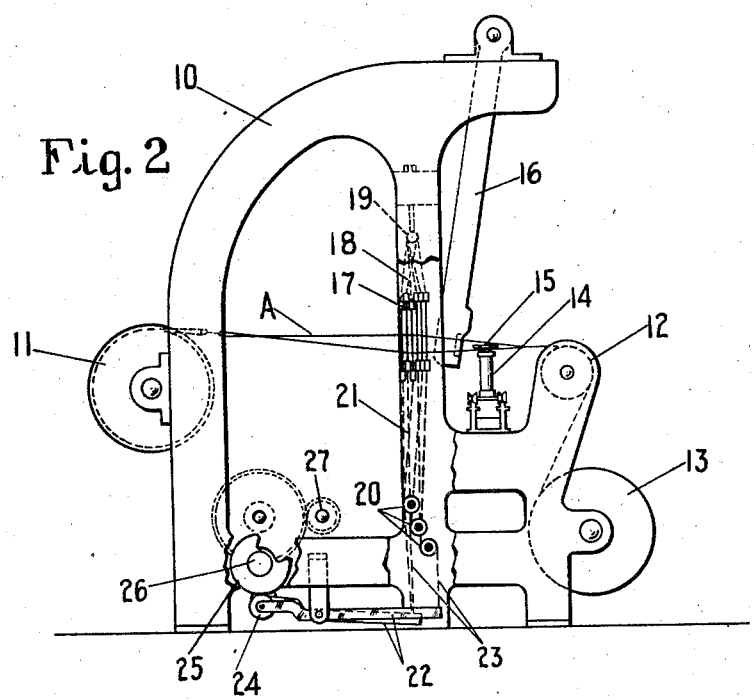
Figure 2:
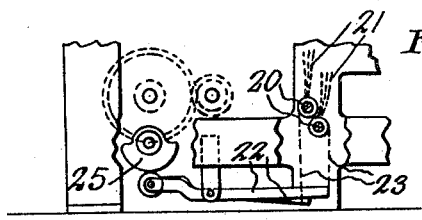

Figure 2 is a side elevation partly broken away of the loom, the elements other than the harnesses and the operating mechanism therefor being disclosed somewhat diagrammatically.

Fig. 2ª is a partial view similar to Fig. 2 of a modification.

Figure 3:
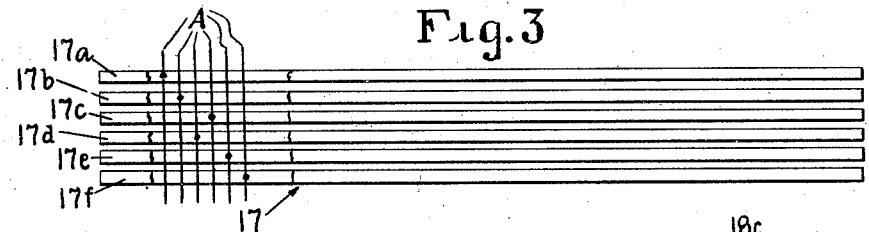

Figure 3 is a diagrammatic plan view of the harnesses.

Figures 4 to 7 inclusive are diagrammatic end views taken from the end of Fig. 3.

Figure 8 is a portion of a strip of wire cloth showing different weaves produced by the harness arrangements in Figs. 4 to 7 inclusive.

Figures 9 to 19 inclusive are sections on the correspondingly numbered lines in Fig. 8.

In Figs. 1 and 2, 10 is the frame of the loom, 11 is the back beam, 12 is the breast beam, 13 is the cloth roll, 14 is the shuttle carrier, 15 is the shuttle and 16 is the lay beam. These elements form no part of the instant invention and for this reason the operating means therefor are not shown.

17 designates the harnesses which in the present embodiment of the invention are six in number although a greater number may be used if desired. The harnesses are supported by means of bands 18 which pass over pulleys or the like 19 supported by the frame 10. One end of each band is connected to one harness so that the harnesses are mounted for movement in unison. Rollers or pulleys 20 are supported by the frame and chains or cords 21 connect each heddle with one of the rollers 20. Rotation of any one of the pulleys 20 will cause two or more of the harnesses to be pulled downwardly, the remaining harnesses being pulled upwardly by means of the bands 18. In some instances, two rollers are used, in which case half of the harnesses are connected to one roller and half to the other (see Fig. 2ª). When so connected, only three bands 18 are used, one end of each band being connected to one of the harness of a set of three and the other end of the band being connected to one harness of the other set of three. In other instances, three rollers are made use of and pairs of the harnesses are connected to each roller. In this circumstance, six bands 18 are used and each harness has connected thereto the ends of two bands.

Rotation of the rollers 20 is accomplished through the medium of the actuating members or levers 22 which are connected to the rollers 20 by cables or the like 23. Each lever 22 is pivotally supported by the frame 10 and is provided with a roller 24 which engages a cam 25 mounted on the countershaft 100

26. The cams are so designed and arranged that there is always one roller 24 out of contact with its cam. The cam shaft 26 is driven by means of a main shaft 27 suitably geared to the countershaft 26. Each lever 22 is of such weight that, when its roller 24 is disengaged from its coacting cam 25, it drops down, thereby causing rotation of the corresponding roller 20 and effecting movement of the harnesses connected thereto. When two rollers 20 are used, each of the cams 25 has a circular surface of approximately 180° of arc (Fig. 2a), and when three rollers are used each cam has a circular operating surface of approximately 240° of arc (Fig. 2). In the latter case each cam is engaged with a roller 24 during two-thirds of a revolution of the shaft 26, the arrangement of the rollers being such that the opposite ends of two of the levers 22 are elevated at any time while the corresponding end of the third operating lever 22 is depressed when 180° cams are used the ends of the operating lever are alternately elevated and depressed.

The warp wires A lead from the back beam 11 through the usual eyes in the harnesses 17, through the lay bar 16, over the breast beam 12 and to the cloth roll 13. The successive warp wires pass respectively through the harnesses in the following order, $17^a$, $17^b$, $17^d$, $17^c$, $17^e$, $17^f$ (see Fig. 3) and repetitions thereof. The harnesses 17 may be of any type suitable to the wire used and the conditions present in the loom.

Figure 4:
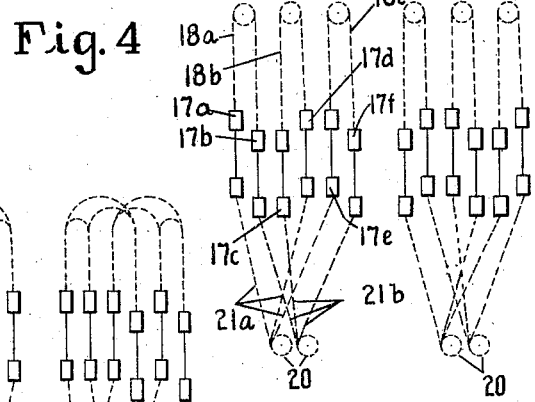

In Figs. 1 and 2 the loom is shown as being equipped with three rollers 20, six harnesses 17 and six supporting bands 18. Each harness has connected thereto the ends of two supporting bands and the harnesses are connected in pairs to the rollers 20 by the cables 21. The loom is also provided with three actuating levers 22 and three 240° actuating cams 25. By differently arranging the connections between the supporting bands, harnesses and rollers the second, third and fourth weaves illustrated in Fig. 8 may be produced. The necessary connections and the sequence of movement of the harnesses for producing these weaves are diagrammatically disclosed in Figs. 5 to 7 inclusive. By using only two rollers 20 and three supporting bands 18, the ordinary weave or the first weave disclosed in Fig. 8 may be produced. Fig. 4 illustrates the connections and the sequence of movements for producing this weave while Fig. 2a shows the arrangement of cams and actuating members.

In Figs. 3 to 7 inclusive reference letters are used to identify the various harnesses 17, the various supporting bands 18 and the various cables 21 connecting the harnesses to the rollers 20. In Fig. 4 the harnesses $17^a$ and $17^b$, the harnesses $17^c$ and $17^d$ and the harnesses $17^e$ and $17^f$ are supported respectively by the bands $18^a$, $18^b$ and $18^c$, each band having one end connected to one harnesses of the corresponding pair. The harnesses $17^a$, $17^c$ and $17^e$ are connected by cables $21^a$ with one roller 20 and the harnesses $17^b$, $17^d$ and $17^f$ are connected by cables $21^b$ with the other roller. Thus when one roller 20 is actuated the harnesses $17^b$, $17^c$ and $17^f$ are pulled downwardly as shown in the left hand section of Fig. 4 and the bands $18^a$, $18^b$ and $18^c$ pull the remaining harnesses upwardly. When the other roller 20 is actuated the positions of the harnesses are just reversed as shown in the right-hand section of Fig. 4. The wire cloth produced with this arrangement of harnesses has the ordinary weave or one over and one under as shown in the first illustration of Fig. 8.

Figure 5:
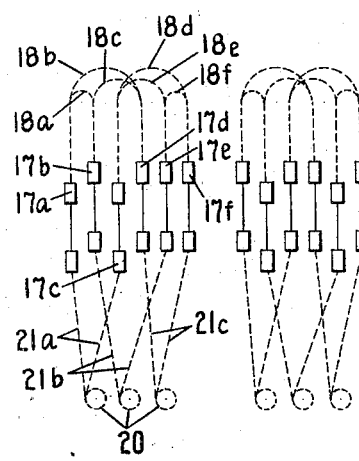

To produce the second illustrated weave in Fig. 8, the harnesses are connected to the supporting bands 18 and the rollers 20 are disclosed in Fig. 5. Harnesses $17^a$ and $17^b$ are connected by band $18^a$. Harnesses $17^a$ and $17^d$ are connected by supporting band $18^b$. The harness $17^b$ is connected to the harness $17^d$ by the band $18^c$. Harness $17^c$ is connected by the bands $18^d$ and $18^e$ with the harnesses $17^f$ and $17^e$ respectively. The harness $17^e$ is connected by the band $18^f$ with the harness $17^f$. The harnesses $17^a$ and $17^c$, the harnesses $17^b$ and $17^e$, the harnesses $17^d$ and $17^f$ are connected by the cables $21^a$, $21^b$ and $21^c$ respectively with the rollers 20. The various positions assumed by the harnesses are disclosed in the three sections of Fig. 5. The first position in this figure shows the harnesses $17^a$ and $17^c$ pulled down due to actuation of the corresponding roller 20 by its actuating lever 22. The remaining levers 22 have been operated by their cams, thus permitting the harnesses $17^b$, $17^d$, $17^e$ and $17^f$ to be raised to the position shown. In the second position, the harnesses $17^b$ and $17^e$ are pulled down, the harnesses $17^d$ and $17^f$ have remained up, and the harnesses $17^a$ and $17^c$ have been lifted. In the third position, the harnesses $17^d$ and $17^f$ are pulled down, the harnesses $17^a$ and $17^c$ remain up, and the harnesses $17^b$ and $17^e$ are raised. From this position, the harnesses are returned to the first position.

Figure 6:
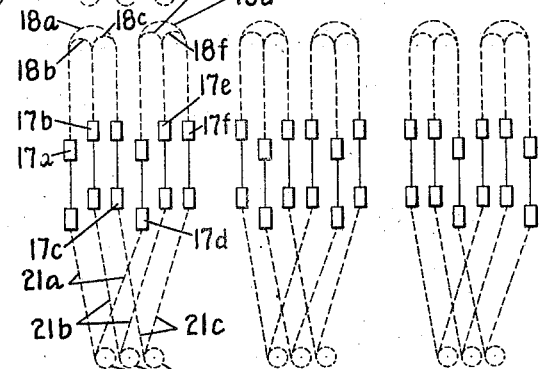

To produce the third weave illustrated in Fig. 8, the harnesses are connected as shown in Fig. 6. The harness $17^a$ is connected to the harnesses $17^b$ and $17^c$ by the supporting bands $18^a$ and $18^b$. The harness $17^b$ is connected to the harness $17^c$ by the supporting band $18^c$. The harness $17^d$ is connected to the harnesses $17^e$ and $17^f$ by the supporting bands $18^d$ and $18^e$ respectively. The harness $17^e$ is connected to the harness $17^f$ by the supporting band $18^f$. The harnesses $17^a$ and $17^d$, the harnesses $17^b$ and $17^e$, and the harnesses $17^c$ and $17^f$ are connected respectively by the cables $21^a$, $21^b$ and $21^c$ to the rollers 20. In the first position, the harnesses $17^a$ and 17$^d$ are down and the harnesses 17$^b$, 17$^c$, 17$^e$ and 17$^f$ are up. In the second position, the harnesses 17$^b$ and 17$^e$ are pulled down, the harnesses 17$^c$ and 17$^f$ remain up, and the harnesses 17$^a$ and 17$^d$ are raised. In the third position, the harnesses 17$^c$ and 17$^f$ are pulled down, the harnesses 17$^a$ and 17$^d$ remain up, and the harnesses 17$^b$ and 17$^e$ are raised. From the third position, the harnesses are returned to the first position.

Figure 7:
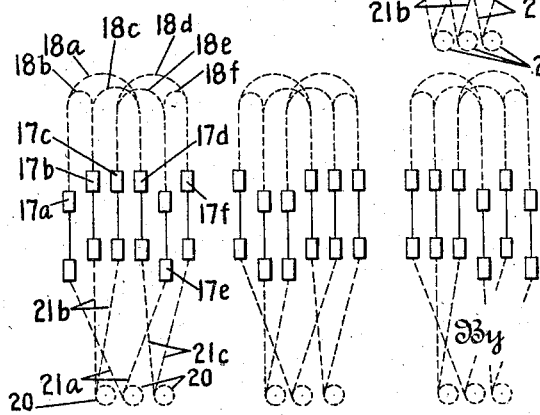

To produce the fourth weave illustrated in Fig. 8, the harnesses are connected as shown in Fig. 7. The harness 17$^a$ is connected by supporting bands 18$^a$ and 18$^b$ with the harnesses 17$^d$ and 17$^b$ respectively. The harness 17$^b$ is connected by supporting band 18$^c$ with the harness 17$^d$. The harness 17$^c$ is connected by the supporting bands 18$^d$ and 18$^e$ with the harnesses 17$^f$ and 17$^e$ respectively. The harness 17$^e$ is connected with the harness 17$^f$ by the supporting band 18$^f$. The harnesses 17$^a$ and 17$^e$, the harnesses 17$^b$ and 17$^c$, and the harnesses 17$^d$ and 17$^f$ are connected by the cables 21$^a$, 21$^b$ and 21$^c$ respectively with the rollers 20. In the first position, the harnesses 17$^a$ and 17$^e$ are down and the harnesses 17$^b$, 17$^c$, 17$^d$ and 17$^f$ are raised. In the second position, the harnesses 17$^b$ and 17$^c$ are pulled down, the harnesses 17$^d$ and 17$^f$ remain raised, and the harnesses 17$^a$ and 17$^e$ are raised. In the third position, the harnesses 17$^d$ and 17$^f$ are pulled down, the harnesses 17$^a$ and 17$^e$ remain up, and the harnesses 17$^b$ and 17$^c$ are raised. From the third position, the harnesses are returned to the first position.

In the arrangement disclosed in Figs. 5, 6 and 7 the harnesses are serially drawn down in pairs and the remaining harnesses are either moved upwardly or maintained in raised position by means of the bands connecting the two depressed harnesses with the remaining harnesses. Each pair of harnesses is so connected by means of the supporting bands to the remaining harnesses that when any pair of harnesses is in the lowered position the remaining harnesses are in raised position.

In using the loom above described to produce without rethreading a wire cloth having the different weaves illustrated in Fig. 8, the machine is threaded in the usual manner with the warp wire A passing through the harnesses, the lay beam and around the breast beam 12 to the cloth roller 13. The harnesses are supported by three bands and one harness of each pair is connected to one roller 20 and the remaining harnesses to the other roller 20, as diagrammatically shown in Fig. 4. 180° cams are provided for operating the actuating levers 22. The loom is then operated in the ordinary manner to weave as much cloth as is desired.

When it is desired to change from the first to the second weave of Fig. 8, the loom is stopped and the connections changed. The harnesses 17 are then supported by the bands 18 and are connected by the cables 21 to the rollers 20 as diagrammatically disclosed in Fig. 5. The countershaft 26 is replaced by a countershaft equipped with three 240° cams 25. The machine is then again operated in the normal manner. When it is desired to change from the second to the third weave disclosed in Fig. 8, the loom is again stopped. The harnesses 17 are then connected to the bands 18 and by the cables 21 to the rollers 20 as disclosed in Fig. 6. When it is desired to change from the third to the fourth weave disclosed in Fig. 8, the harnesses are connected to the bands 18 and by the cables 21 to the rollers 20 as disclosed in Fig. 7.

All the above changes of connections and substitutes of cams may be accomplished without in any way disturbing the warp wires A. These wires remain threaded through the harnesses and through the lay beam regardless of what changes are made in the means for actuating the harnesses. It is therefore possible with this loom to produce a continuous length of cloth having different weaves without removing the cloth from the loom and without rethreading the loom.

It is apparent that the harnesses may be differently connected by the bands 18 and to the rollers 20 by the cables 21 than has been disclosed herein, and that these other connections lie within the spirit of this invention. Although the cams have been disclosed as being 230° of arc, it is apparent that they might be 120° of arc instead and still accomplish substantially the same results. In such an event, instead of two harnesses being down in each position and four up, there would be two harnesses up and four down in each position. It is to be understood further that various structural modifications and arrangements of the elements may be made without in any way departing from the spirit of the invention as defined in the appended claims.

I claim:

1. In a loom, a plurality of pairs of reciprocal harnesses, means individual to each pair of harnesses for serially actuating said pairs, and means for actuating the remaining harnesses by each of said pairs of harnesses.

2. In a loom, a plurality of pairs of reciprocal harnesses, means individual to each pair of harnesses for serially moving said pairs of said harnesses in one direction, and means for actuating the remaining harnesses by each of said pairs of harnesses.

3. In a loom, at least six reciprocal harnesses, means for serially actuating said harnesses in pairs, and means for actuating the remaining harnesses by each of said pairs of harnesses.

4. In a loom, at least six reciprocal harnesses, means for serially moving pairs of said harnesses in one direction, and means for actuating the remaining harnesses by each of said pairs of harnesses.

5. In a loom, a plurality of pairs of harnesses, bands supporting said harnesses for reciprocation, means serially actuating said pairs, the bands being connected to said harnesses to cause actuation of the remaining harnesses by each of said pairs of harnesses.

6. In a loom, a plurality of pairs of harnesses, bands supporting said harnesses for reciprocation, said bands connecting each harness of a pair with two of the remaining harnesses actuating members, each actuating member being connected to a pair of harnesses and operating cams for said actuating means, said cams and bands being variable to determine the sequence of movement of said harnesses.

7. In a loom, a plurality of pairs of harnesses, bands for supporting said harnesses for reciprocation, said bands connecting each harness of a pair with two of the remaining harnesses and actuating means individual to each pair of harnesses, said bands and actuating means being variable to determine the sequence of movement of the harnesses.

8. In a loom, at least six harnesses, bands supporting said harnesses for reciprocation, said bands connecting each heddle with two of the remaining harnesses and means for serially actuating pairs of said harnesses, said actuating means and bands being variable to determine the sequence of movement of said harnesses.

9. In a loom, a plurality of pairs of harnesses, a plurality of bands supporting said harnesses for reciprocation, each band having its ends connected to a harness of different pairs of harnesses and each harness having the ends of two bands connected thereto, an actuating member connected to each pair of harnesses, and means for serially operating said actuating-members.

10. In a loom, a plurality of pairs of harnesses, a plurality of bands supporting said harnesses for reciprocation, each harness being supported by more than one band, an actuating member for each pair of heddles, and means for serially operating said actuating members.

11. In a loom, six or more harnesses, a like number of bands supporting said harnesses for reciprocation, each harness having connected thereto the ends of two bands, and means individual to pairs of harnesses for serially actuating the same.

12. In a loom, six or more harnesses, a like number of bands supporting said harnesses for reciprocation, each harness having connected thereto the ends of two bands, actuating members individual to pairs of harnesses and means for serially operating said actuating members.

13. In a loom, a plurality of pairs of harnesses, bands supporting said harnesses for reciprocation, each band having its ends connected to harnesses of different pairs, actuating members individual to said pairs of harnesses and operating cams for said actuating members, said cams being arranged to operate said actuating members serially.

14. In a loom, a plurality of pairs of reciprocal harnesses, means individual to each pair of harnesses for serially actuating said pairs, and means connecting each pair of harnesses with the remaining harnesses for actuating the same, said connecting means and actuating means being variable to change the sequence of movement of said harnesses.

15. In a loom, a plurality of reciprocal harnesses, means individual to each pair of harnesses for serially moving said pairs in one direction and for remaining harnesses in the opposite direction.

16. In a loom, a plurality of reciprocal harnesses, means individual to each pair of harnesses for serially moving said pairs in one direction, and means for supporting said harnesses and effecting movement in the other direction of the remaining harnesses.

17. In a loom, a plurality of pairs of reciprocal harnesses, bands connecting each harness of a pair with two of the remaining harnesses whereby movement of the former in one direction effects movement of the latter in the opposite direction, and means individual to each pair of harnesses for moving the same in said first direction.

In testimony whereof, I have signed my name to this specification.

CHARLES A. COUPS.

CERTIFICATE OF CORRECTION.

Patent No. 1,744,212.   Granted January 21, 1930, to

CHARLES A. COUPS.

It is hereby certified that error appears in the printed specification of the above numbered patent requiring correction as follows: Page 1, line 28, and page 4, line 49, claim 10, for the word "heddles" read "harnesses"; and that the said Letters Patent should be read with these corrections therein that the same may conform to the record of the case in the Patent Office.

Signed and sealed this 11th day of March, A. D. 1930.

(Seal)

M. J. Moore,
Acting Commissioner of Patents.